US010152863B2

(12) United States Patent
Lamothe et al.

(10) Patent No.: US 10,152,863 B2
(45) Date of Patent: Dec. 11, 2018

(54) DUAL COMMUNICATION FREQUENCY RFID CIRCUIT EQUIPPED WITH A TAMPER-EVIDENT LOOP

(71) Applicant: EM Microelectronic-Marin S.A., Marin (CH)

(72) Inventors: Christian Lamothe, Travers (CH); Paul Muller, Crissier (CH); Goran Stojanovic, Neuchatel (CH)

(73) Assignee: EM Microelectronic-Marin S.A., Marin (CH)

( * ) Notice: Subject to any disclaimer, the term of this patent is extended or adjusted under 35 U.S.C. 154(b) by 0 days.

(21) Appl. No.: 15/831,444

(22) Filed: Dec. 5, 2017

(65) Prior Publication Data
US 2018/0182217 A1 Jun. 28, 2018

(30) Foreign Application Priority Data

Dec. 22, 2016 (EP) ..................................... 16206224

(51) Int. Cl.
*G08B 13/24* (2006.01)
*G06K 19/07* (2006.01)
*G06K 19/073* (2006.01)

(52) U.S. Cl.
CPC ..... *G08B 13/2448* (2013.01); *G06K 19/0724* (2013.01); *G06K 19/07381* (2013.01); *G08B 13/2477* (2013.01)

(58) Field of Classification Search
CPC ............ G08B 13/2448; G08B 13/2477; G06K 19/0724; G06K 19/07381
See application file for complete search history.

(56) References Cited

U.S. PATENT DOCUMENTS

| 6,646,550 B1 * | 11/2003 | Runyon | ................... | E05G 1/10 |
| | | | | 340/531 |
| 6,888,509 B2 * | 5/2005 | Atherton | .............. | G06K 19/073 |
| | | | | 235/492 |

(Continued)

FOREIGN PATENT DOCUMENTS

| EP | 0 825 554 A1 | 2/1998 |
| WO | WO 2006/102678 A1 | 9/2006 |

OTHER PUBLICATIONS

European Search Report dated Jul. 17, 2017 in European Application 16206224.4, filed on Dec. 22, 2016 (with English Translation of Categories of cited documents).

*Primary Examiner* — Nay Tun
(74) *Attorney, Agent, or Firm* — Oblon, McClelland, Maier & Neustadt, L.L.P.

(57) ABSTRACT

A dual communication frequency RFID circuit includes a logic unit for processing data signals received or transmitted at a first frequency by a first antenna or at a second frequency by a second antenna, and a unit for managing the state of a tamper loop linked to the integrated circuit by two connection terminals. The management unit includes a first low-pass filter linked to a first connection terminal, a second low-pass filter linked to a second connection terminal, a current source for supplying a current through the first low-pass filter, a switch linked at the output of the second low-pass filter, and a first inverter connected between the current source and the first low-pass filter for supplying an output signal for the state of the tamper loop to the logic unit.

15 Claims, 3 Drawing Sheets

(56) References Cited

U.S. PATENT DOCUMENTS

| | | | |
|---|---|---|---|
| 7,135,973 B2* | 11/2006 | Kittel | G06K 19/07798 340/568.2 |
| 7,388,493 B2* | 6/2008 | Lerch | G06K 19/07381 340/572.1 |
| 9,082,057 B2* | 7/2015 | McGregor | G06K 19/07372 |
| 2005/0242962 A1* | 11/2005 | Lind | G06K 19/073 340/572.8 |
| 2006/0214789 A1 | 9/2006 | Posamentier et al. | |
| 2007/0120381 A1* | 5/2007 | Ehrensvard | G08B 13/1445 292/307 R |
| 2008/0198011 A1* | 8/2008 | Leper | G08B 13/1445 340/572.1 |
| 2011/0043339 A1 | 2/2011 | McGregor | |

\* cited by examiner

US 10,152,863 B2

DUAL COMMUNICATION FREQUENCY RFID CIRCUIT EQUIPPED WITH A TAMPER-EVIDENT LOOP

This application claims priority from European Patent Application No. 16206224.4 filed on Dec. 22, 2016, the entire disclosure of which is hereby incorporated herein by reference.

TECHNICAL FIELD

The present invention relates to a dual communication frequency RFID circuit equipped with a tamper loop linked to a management unit. The unit for managing the tamper loop is linked to a logic unit or to a processor of the RFID circuit so as to be controlled.

TECHNOLOGICAL BACKGROUND

It is known to equip an electronic circuit with a tamper-evident detection part, in particular in order to monitor the authenticity of products with respect to possible counterfeits. This detection part may generally be incorporated into an integrated circuit of CMOS type acting as a transponder. A tamper loop to be placed on a product to be authenticated is linked to terminals or connection pads of the electronic circuit connected to the detection part. The detection part monitors the presence, or lack thereof, of a short circuit between the two connection terminals, that is to say monitors whether the tamper loop is broken or unbroken.

In the case of a product such as a bottle of wine, the tamper loop may be integrated for example into the cork, and may be broken when a corkscrew is introduced. The detection part therefore makes it possible to monitor whether the loop is broken or unbroken. As a result, it is not possible to reuse the electronic circuit, which may be a transponder, in a counterfeit product in such a way as to make people believe that it is an authentic product. It must also be possible to communicate via the transponder before and after the opening of the bottle, that is to say after the destruction of the loop or of the short circuit. The antenna of the transponder is therefore not able to be used as a tamper loop, as this would impede the communication of wireless signals to or from the transponder to an RFID reader.

In the patent application US 2006/0214789 A1 and with reference to FIG. 1, a description is given of an RFID transponder 100 of passive type with a security sensor, such as a tamper loop 101. The transponder comprises at least one antenna 110 in order to be able to communicate with an RFID reader 200 via an antenna 210. The RFID transponder 100 comprises separate terminals for connecting the tamper loop 101. The transponder 100 also comprises a radiofrequency signal reception and transmission unit 102 linked to the antenna 110 and supplying power to a power supply circuit 105. A logic unit 103 is provided with a memory in which an identification code to be transmitted is stored, and which is linked to a circuit 104 for detecting the state of the tamper loop.

In this patent application US 2006/0214789 A1, there is nothing described with regard to using such a tamper loop for a transponder that has to work under various RF electromagnetic fields. There is no provision made to design such a loop for a transponder capable of receiving or of transmitting signals at different carrier frequencies, this constituting a drawback.

In the U.S. Pat. No. 9,082,057 B2 and with reference to FIG. 2, a description is given of an RFID transponder 100 of passive type with a tamper loop 101. The transponder 100 comprises a radiofrequency signal receiver 102 and transmitter 109. It also comprises a non-volatile memory 106 for storing various data, including the state of the tamper loop, and a state detection circuit 107 linked to a unit 108 for managing the loop.

For this tamper loop 101, this requires three connection terminals with one terminal linked to the ground terminal, one terminal linked to the management unit 108 and one terminal linked to a current source Ipol by way of a resistor R1. Another resistor R2 is arranged between the terminal linked to ground and the one linked to the management unit 108. As in the preceding document, there is no provision made to design a tamper loop for a transponder receiving or transmitting signals at different carrier frequencies, this constituting a drawback.

FIG. 3 shows an overview of the principle of operation of a tamper loop 101 connected to two connection terminals Tamper_in and Tamper_out of the integrated circuit of a transponder. A logic input signal Tamper_en controls the use of the unit for managing the state of the tamper loop 101. This input signal Tamper_en makes it possible to control the closure of a first switch S1 linked between a current source I1 linked to a supply voltage Vsup and a first connection terminal Tamper_in of the loop. The input signal Tamper_en also makes it possible to control the closure of a second switch S2 between a second connection terminal Tamper_out of the loop and a current source I2 linked to ground.

The value of the current from the current source I1 is greater than the value of the current from the current source I2, for example 10 times greater. An inverter 120 may also be provided by connection to the second connection terminal Tamper_out for supplying an output signal Short for the state of the tamper loop 101. When the two switches S1 and S2 are closed, the state of the output signal of the inverter 120 is in the low state so as to indicate that the tamper loop is not broken, and in the high state if the loop is broken.

No prior art document describes the use of two different frequency ranges for a communication of data from a transponder that is equipped with a tamper loop. These frequency bands are for example the HF band at 13.56 MHz for NFC near-field communications and the UHF band at 915 MHz for long-distance communications. As the tamper loop may be in any form, it may behave as a radio antenna in a noisy electromagnetic environment. As a result, it is necessary to implement electromagnetic compatibility (EMC) circuitry in order to obtain an appropriate measurement of the state of the tamper loop.

The transponder generally operates at a low power, which power is limited depending on the electromagnetic field used for the communication. Under these conditions, it must be mandatory for the tamper-evident function of the circuit to consume little current while having a measurement time that is short enough to determine the state of the tamper loop. It must also not be disturbed by a parasitic capacitor of an external assembly connected to the terminals of the tamper loop when the latter is absent or broken.

SUMMARY OF THE INVENTION

The aim of the invention is therefore to mitigate the drawbacks of the abovementioned prior art by providing a dual communication frequency RFID circuit equipped with a tamper loop linked to a management unit.

To this end, the invention relates to a dual communication frequency RFID circuit equipped with a tamper loop linked to a management unit, which RFID circuit comprises a dual communication frequency RFID circuit, comprising a logic unit for processing data signals received or transmitted at a first frequency by a first antenna or at a second frequency by a second antenna, the first communication frequency being lower than the second communication frequency, the logic unit being connected to a unit for managing the state of a tamper loop linked to the integrated circuit by two connection terminals, wherein the management unit comprises at least one first low-pass filter linked to a first connection terminal, at least one second low-pass filter linked to a second connection terminal, a current source for supplying a current through the first low-pass filter, a switch linked at the output of the second low-pass filter, and a first inverter connected between the current source and the first low-pass filter for supplying an output signal for the state of the tamper loop to the logic unit.

Particular embodiments of the RFID circuit are defined in dependent claims 2 to 15.

One advantage of the RFID circuit equipped with a tamper loop lies in the fact that the unit for managing the state of the tamper loop of the RFID circuit is designed so as not to be disturbed by any communication at the two communication frequencies and while taking into account the resonant circuit formed of the tamper loop and of a parasitic capacitor connected to the connection terminals of the tamper loop.

Advantageously, the RFID circuit comprises at least one low-pass filter linked to each connection terminal of the tamper loop in such a way as to filter out interferences. Each filter is designed to filter out interferences from a communication at at least one first frequency and/or at at least one second frequency different from the first frequency. Each low-pass filter may be identical so as to guarantee symmetry in order to reduce a quality factor Q of the resonant circuit formed of the loop and of the parasitic capacitor at the input. As a result, any induced voltage on one connection terminal is automatically compensated by the inverse voltage on the other connection terminal.

Advantageously, the unit for managing the state of the tamper loop of the RFID circuit comprises at least one first low-pass filter linked to each connection terminal of the tamper loop followed by a second low-pass filter for filtering out all of the interferences. Each first low-pass filter and each successive second low-pass filter is designed to filter out interferences from a communication at a first frequency and at a second frequency different from the first frequency. Preferably, the first frequency is a frequency of the order of 13.56 MHz, and the second frequency is a frequency of the order of 915 MHz.

BRIEF DESCRIPTION OF THE FIGURES

The aims, advantages and features of the dual communication frequency RFID circuit equipped with a tamper loop will become more apparent from the following description on the basis of at least one non-limiting embodiment illustrated by the drawings, in which.

DETAILED DESCRIPTION OF THE INVENTION

In the following description, all of the electronic components of the dual communication frequency RFID circuit that are well known to those skilled in the art in this technical field will be referred to only in a simplified manner. The main emphasis is on the unit for managing the state of the tamper loop of the RFID circuit, as explained hereinafter.

Figure 1:
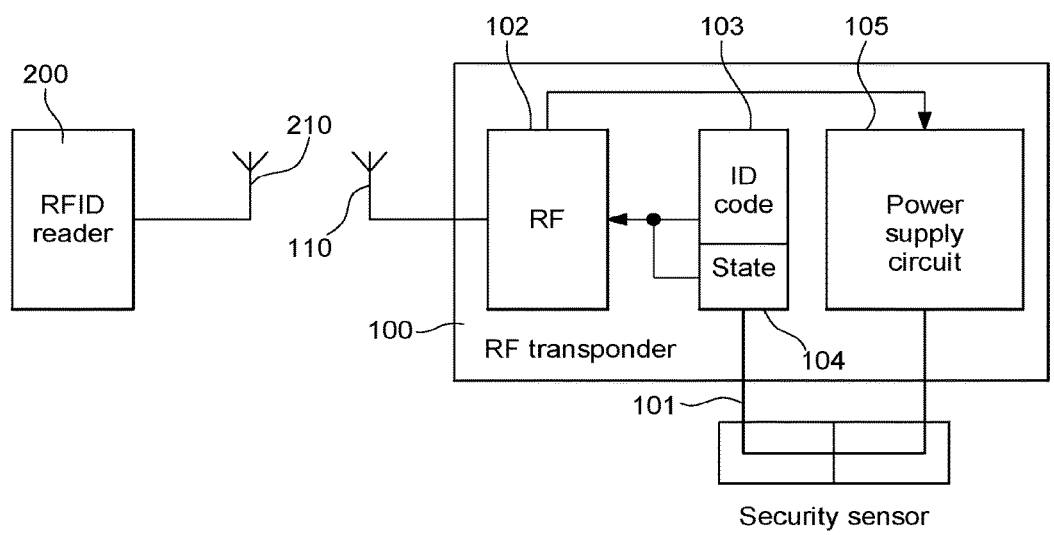
FIG. 1, already cited, schematically shows a first embodiment of an RFID electronic circuit equipped with a tamper loop from the prior art, FIG. 2, already cited, schematically shows a second embodiment of an RFID electronic circuit equipped with a tamper loop from the prior art, FIG. 3, already cited, shows a schematic overview of a unit for managing the state of a tamper loop for an RFID circuit from the prior art, FIG. 4 schematically shows an embodiment of a dual communication frequency RFID circuit equipped with a tamper loop according to the invention.
Figure 2:
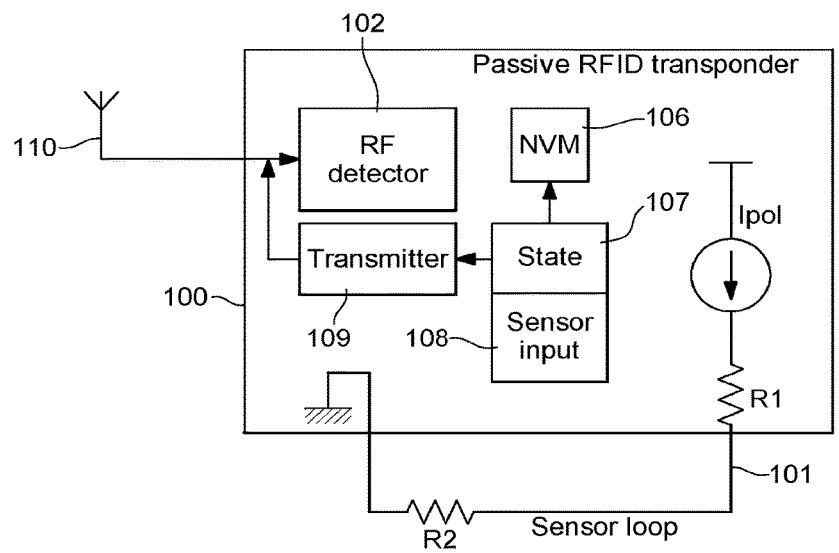
Figure 3:
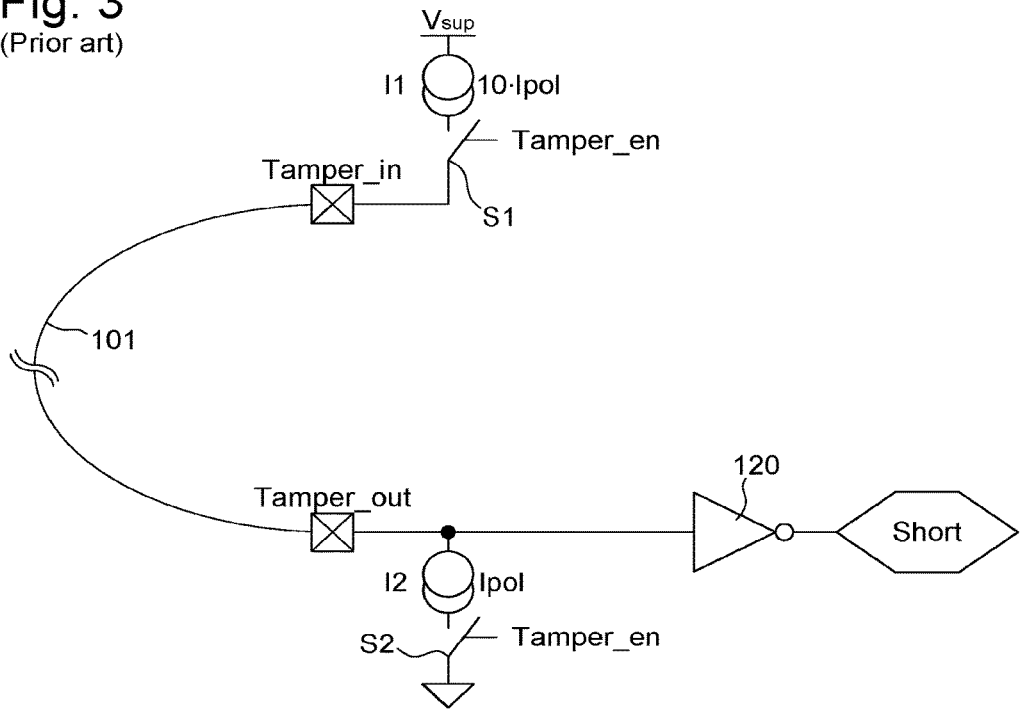
Figure 4:
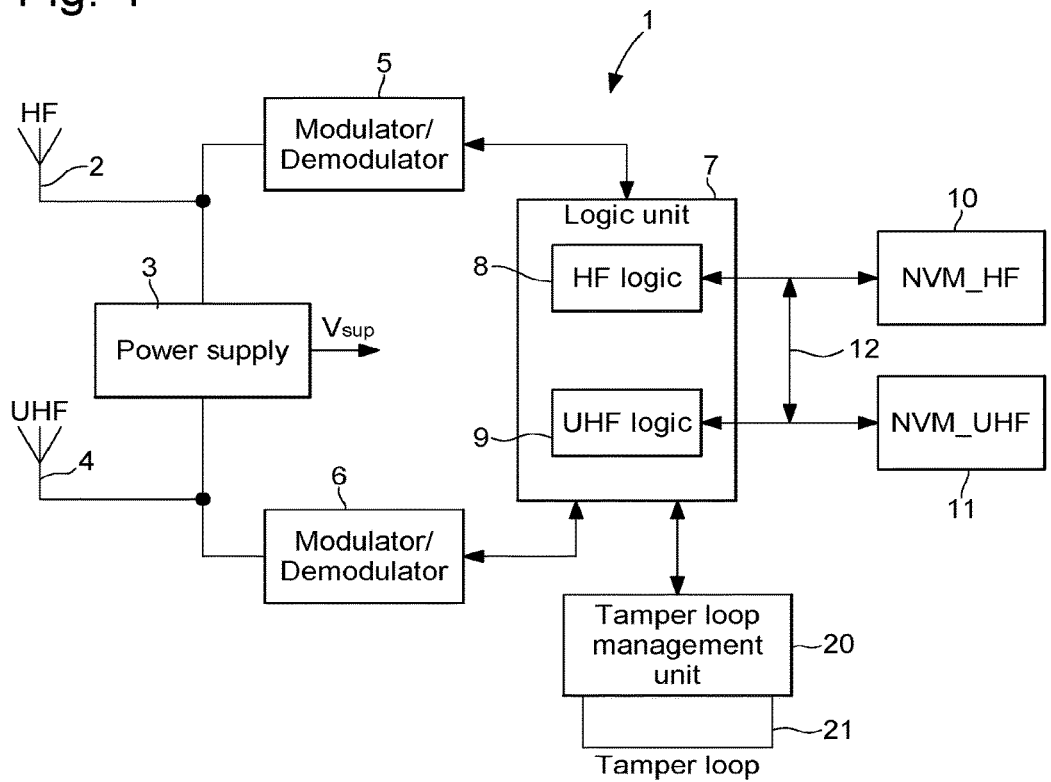

FIG. 4 shows an embodiment of a dual communication frequency RFID circuit equipped with a tamper loop according to the invention. The RFID circuit is preferably a transponder 1 that is designed to be able to communicate with an RFID interrogator, such as an RFID reader. A first communication frequency may be lower than a second communication frequency.

The transponder 1 comprises a first antenna 2 designed to operate at a first frequency, which may be a first high frequency situated between 3 MHz and 30 MHz, preferably of the order of 13.56 MHz for establishing an NFC near-field communication. This first antenna 2 may receive or transmit communication signals in accordance with a first communication protocol. The first antenna 2 is linked to a first modulator/demodulator 5 for modulating the data to be transmitted or demodulating the data to be received. The first modulator/demodulator 5 is connected to a logic unit 7 for processing the received demodulated data or the data to be transmitted. The logic unit 7 comprises a first HF control unit 8 and a second UHF control unit 9. The first HF control unit 8 is designed to process data in accordance with the first communication protocol, while the second UHF control unit 9 is designed to process data in accordance with a second communication protocol.

The transponder 1 also comprises a second antenna 4 designed to operate at a second frequency, which may be an ultra-high frequency UHF situated between 300 MHz and 3 GHz, preferably of the order of 915 MHz for establishing long-distance communication. The second antenna 4 may receive or transmit communication signals in accordance with the second communication protocol. This second communication protocol may be for example the EPC Class-1 Generation-2 (Gen2) protocol. The second antenna 4 is linked to a second modulator/demodulator 6, which is linked to the logic unit 7. The signals received or transmitted in accordance with this second protocol are thus processed by the second UHF control unit 9.

The first HF control unit 8 is connected to a first non-volatile memory 10 (NVM_HF), while the second UHF control unit 9 is connected to a second non-volatile memory 11 (NVM_UHF). A memory bus 12 may also be provided for connecting the two non-volatile memories. A power source 3 is also provided in the RFID circuit (transponder) for supplying the supply voltage Vsup to the various electronic components of the RFID circuit. This transponder may therefore be of passive type, with the supply of electric power supplied by rectifying radiofrequency signals received by the first antenna 2 or the second antenna 4, or of active type with a power source specific to the RFID circuit.

The RFID circuit 1 also comprises a unit 20 for managing the state of a tamper loop 21. The tamper loop 21 is generally connected to two terminals or contact or connection pads of the RFID integrated circuit so as to be linked to the management components of the management unit 20 that is connected to the logic unit 7. As explained hereinafter, the management unit 20 determines the state of the tamper loop 21, which loop may be intact or broken. The state of the loop may be communicated to the first HF control unit 8 or to the second UHF control unit 9 so as to transmit this information in accordance with the first protocol or the second protocol. The state of the loop may also be stored in one of the non-volatile memories, for example in the second non-volatile memory 11 (NVM_UHF).

Figure 5:
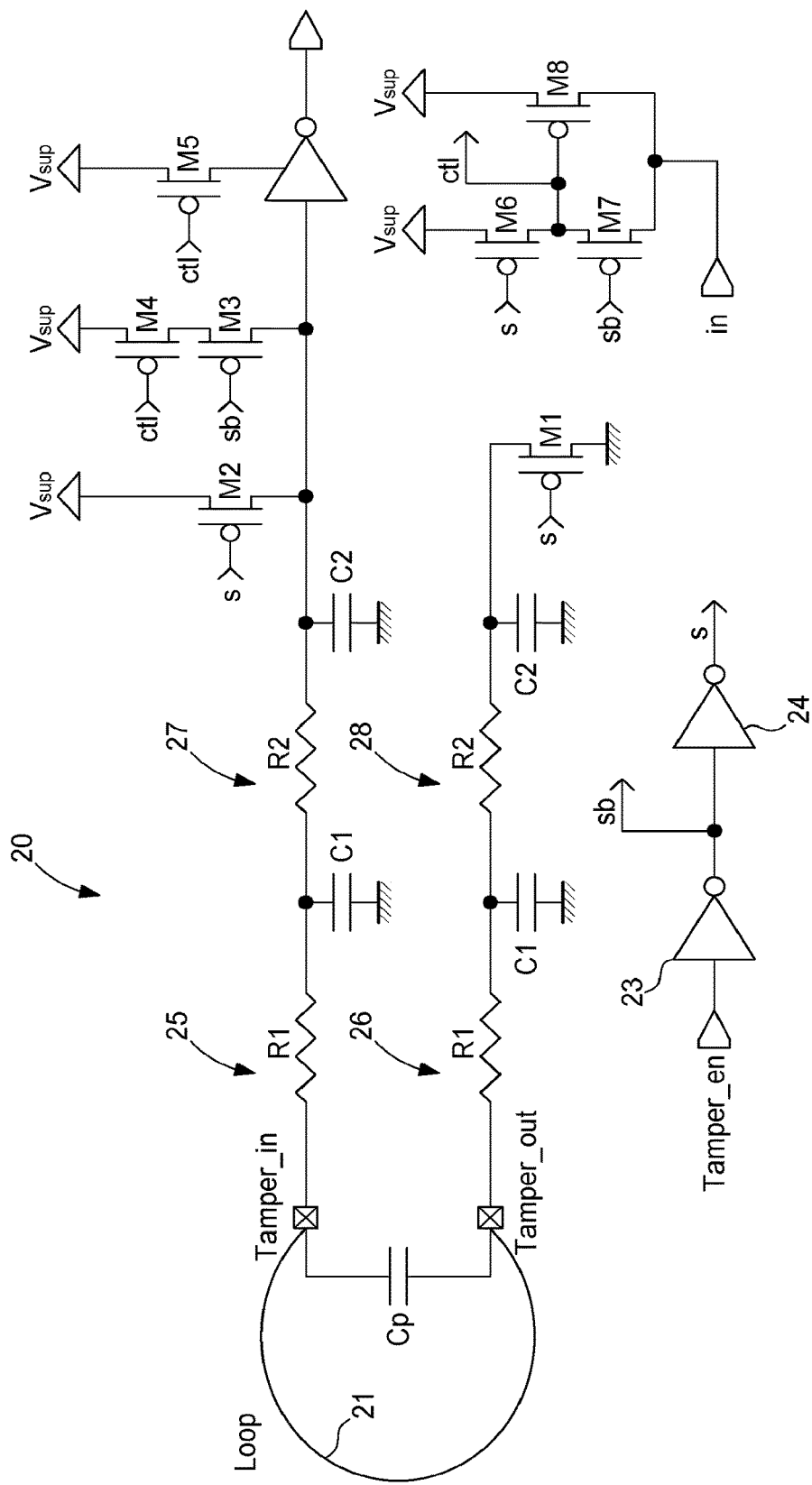
FIG. 5 shows the various components of a unit for managing the state of the tamper loop for the dual communication frequency RFID circuit according to the invention.

FIG. 5 shows the various components of the unit 20 for managing the state of the tamper loop 21 for the dual communication frequency RFID circuit. The tamper loop 21 is connected to two terminals or connection pads Tamper_in and Tamper_out while being associated with a parasitic capacitor Cp defining a resonant circuit with a quality factor Q. As explained in greater detail hereinafter, a logic input signal Tamper_en is supplied from the logic unit so as to control the use of the management unit 20, and an output signal Short is supplied so as to give the state of the tamper loop 21. An input connector in is also provided in order to establish a small reference current available in the RFID circuit. The management unit 20 is connected between the supply voltage Vsup and ground.

Starting from the first connection terminal Tamper_in, the management unit 20 comprises at least one first low-pass filter 25, formed of a first resistor R1 linked to the first connection terminal Tamper_in and of a first capacitor C1 linked to ground. Starting from the second connection terminal Tamper_out, the management unit 20 comprises at least one second low-pass filter 26, formed of a first resistor R1 linked to the second connection terminal Tamper_out and of a first capacitor C1 linked to ground. Preferably, the first low-pass filter 25 linked to the first connection terminal is identical to the second low-pass filter 26 linked to the second connection terminal. These low-pass filters linked to the connection terminals make it possible to ensure electromagnetic compatibility and filtering for the processing of the data.

Another pair of low-pass filters may also be connected after the first low-pass filter 25 and the second low-pass filter 26. Thus, a third low-pass filter 27 (R2, C2) is linked to the first low-pass filter 25 and a fourth low-pass filter 28 (R2, C2) is linked to the second low-pass filter 26. A second resistor R2 of the third low-pass filter 27 is linked to the connecting node for the first resistor R1 and the first capacitor C1 of the first low-pass filter 25, while a second capacitor C2 is linked to ground. A second resistor R2 of the fourth low-pass filter 28 is linked to the connecting node for the first resistor R1 and the first capacitor C1 of the second low-pass filter 26, while a second capacitor C2 is linked to ground. The third low-pass filter 27 is preferably identical to the fourth low-pass filter 28, so as to ensure symmetry of the management unit.

It should be noted that all of the capacitors C1, C2 of the low-pass filters may also be linked to the supply voltage terminal Vsup rather than to ground.

The connecting node for the second resistor R2 and the second capacitor C2 of the third low-pass filter 27 is linked to a first inverter 22, which supplies an output signal Short representing the state of the tamper loop for the logic unit. The connecting node for the second resistor R2 and the second capacitor C2 of the fourth low-pass filter 28 is linked in series to an MOS transistor M1, which transistor is preferably a first NMOS transistor, the source of which is linked to ground, and which transistor is controlled on its gate by an activation signal s depending directly on a logic input signal Tamper_en supplied from the logic unit. The logic input signal is first of all supplied to a second inverter 23, followed by a third inverter 24 so as to supply the activation signal s. The second inverter 23 supplies an inverse activation signal sb. A second MOS transistor M2 is linked between the supply voltage terminal Vsup and the connecting node for the second resistor R2 and the second capacitor C2 of the third low-pass filter. This second transistor M2 is preferably a PMOS transistor controlled on its gate by the activation signal s.

There is also provided a third MOS transistor M3 in series with a fourth MOS transistor M4, these being arranged between the supply voltage terminal Vsup and the connecting node for the second resistor R2 and the second capacitor C2 of the third low-pass filter 27. These third and fourth MOS transistors M3, M4 are preferably PMOS transistors. The gate of the third transistor M3 is controlled by the inverse activation signal sb, while the gate of the fourth transistor M4 is controlled by a control signal ctl. The assembly of the third transistor M3 and the fourth transistor M4 forms a current source when the two transistors are put into the on state, so as to flow through the low-pass filters, the tamper loop 21 if this is intact and the first transistor M1 put into the on state, which transistor is also a switch.

To supply this control signal ctl, there is provided, in series between the supply terminal Vsup and a reference current terminal in, a sixth MOS transistor M6 and a seventh MOS transistor M7, which transistors are preferably PMOS transistors. An eighth MOS transistor M8, which is preferably a PMOS transistor, is connected in parallel with the sixth and seventh PMOS transistors M6, M7, while being linked between the supply terminal Vsup and the reference current terminal in. The gate of the eighth PMOS transistor M8 is linked to the connecting node for the sixth and seventh PMOS transistors M6, M7, which node supplies the control signal ctl. The gate of the sixth PMOS transistor M6 is controlled by the activation signal s, while the gate of the seventh PMOS transistor M7 is controlled by the inverse activation signal sb.

There may also be provided a fifth MOS transistor M5 for activating the first inverter 22. This fifth transistor M5 may be a PMOS transistor linked between the power supply of the first inverter 22 and the supply terminal Vsup. The gate of the fifth transistor M5 is controlled by the control signal ctl. This fifth transistor M5 is generally in the on state when the third and fourth transistors M3, M4 are in the on state. However, it may also be envisaged to leave the first inverter 22 always activated and supplied directly at the supply voltage Vsup.

At the outset, the logic input signal Tamper_en is set to 0, this meaning that the first transistor M1 is OFF and the second transistor M2 is ON. As a result, all of the capacitors C1, C2 via the tamper loop 21 are pre-charged. Next, during the evaluation period, the logic input signal Tamper_en is set to 1, this leading, on the positive power supply Vsup side, to M2 being switched OFF and it being replaced with the third and fourth PMOS transistors M3, M4, which are activated by the inverse activation signal sb and the control signal ctl.

The tamper loop 21 has to work in a noisy electromagnetic environment, as electromagnetic fields are used to communicate with the RFID circuit that is to say with the transponder. As a result, when the tamper loop 21 is present, it has to behave as a short circuit, and when it is open or broken as an open circuit in spite of its inductive characteristic.

The tamper loop 21 is currently a part of a resonant circuit, which also includes the parasitic capacitor Cp. The loop receives the electromagnetic fields and modifies them in terms of voltage, which voltage is amplified by the quality factor Q of the resonant circuit. In order to be able to limit the unwanted effects of the induced voltage generated by the electromagnetic fields, the management unit 20 is thus designed to reduce the quality factor Q of the resonant circuit. This makes it possible to avoid accumulating unwanted energy. The circuitry linked to the connection terminals thus has to be symmetrical so as to reduce this quality factor Q. As a result, any induced voltage on one connection terminal is automatically compensated by the inverse voltage on the other connection terminal, and as a result, ground is not disturbed by any injected charge.

An indication is given hereinafter of exemplary dimensions of the components of the unit for managing the tamper loop. The equations that govern the choice of the components for the management unit are defined as follows:

$$Rc = 2 \cdot (L/C)^{1/2},$$

where Rc is the critical resistance of an LC resonant circuit, $$F = 1/(2 \cdot \pi \cdot (L \cdot C)^{1/2}),$$

where F is the resonant frequency of an LC resonant circuit, $$Ei = K \cdot L \cdot 2 \cdot \pi \cdot F \cdot I,$$

where Ei is the induced voltage created by a similar loop (L) having a coupling factor K and drawing a current I at the frequency F, $$L = \mu_0 \cdot (\pi/2) \cdot R,$$

where R is the radius of the loop and $\mu_0$ is the universal constant having a value of $4 \cdot \pi \cdot 10^{-7}$.

In order to define the quality factor Q of the management unit 20 linked to the tamper loop 21, it is necessary to take into account the following facts:

It is estimated that the loop, which is generally in the form of a shorted line, may be in this case a circular loop with a radius of 2 cm, leading to an inductance of 40 nH as follows:

$$L = \mu_0 \cdot (\pi/2) \cdot R = 4\pi \cdot 10^{-7} \cdot (\pi/2) \cdot 2 \cdot 10^{-2} = \text{approximately 40 nH}.$$

The first internal capacitor C1 of the first and second low-pass filters must not be excessively large in order to save space in the transponder. As a result, it has been found to be beneficial to have a resonant frequency slightly below the UHF band 915 MHz that is used. A good compromise is to use 484 MHz as a resonant frequency for designing the circuit of the management unit, leading to an acceptable capacitance of 2.7 pF as follows:

$$C = 1/(L \cdot (2 \cdot \pi \cdot F)^2) = \text{approximately 2.70 pF}.$$

As the capacitance C represents the combined value of the two capacitors C1 in series, C1 may be calculated as follows:

$$C1 = 2 \cdot C = 2 \cdot 2.70 \text{ pF} = 5.4 \text{ pF}.$$

The second component of the circuitry of the management unit is the value of the resistor, which draws power, and which may be calculated as follows:

$$Rc = 2 \cdot (L/C)^{1/2} = 2 \cdot (40 \text{ nH}/2.70 \text{ pF})^{1/2} = \text{approximately 240 Ohms}.$$

As the resistance Rc represents the combined value of the two first resistors R1 in series in the first and second low-pass filters, R1 may be calculated as follows:

$$R1 = Rc/2 = 120 \text{ Ohms}.$$

As a result, the values of the components R1 and C1 of the first and second low-pass filters have been obtained.

It may be noted that the first and second low-pass filters have a cutoff frequency Fc as follows:

$$Fc = 1/(2 \cdot \pi \cdot R1 \cdot C1) = 246 \text{ MHz}$$

By contrast, it should be noted that these first and second low-pass filters are ineffective against the disturbance of the channel at 13.56 MHz in use in the transponder.

The second communication channel in the 13.56 MHz band is far from the resonant frequency of the tamper loop 21 associated with the circuitry of the management unit 20. As a result, it is possible to calculate the induced voltage as follows, considering a coupling factor K of 0.1 and an induced current of 1 A (reference unit):

$$Ei = K \cdot L \cdot 2 \cdot \pi \cdot F \cdot I = 340 mV$$

As this calculated voltage is evaluated as being slightly too large to be applied directly to the drains of the MOS transistors such as M1, M2 or M3, third and fourth low-pass filters R2, C2 have been added.

In order to easily calculate the components R2 and C2 of these low-pass filters, and study simple behaviours, a few points need to be taken into consideration:

The cutoff frequency F2 of the third and fourth low-pass filters must be around one decade below the 13.56 MHz communication band. Three decades are generally used.

The second resistance R2 must be much larger than the first resistance R1, while the first capacitance C1 must be much larger than the second capacitance C2, such that the smallest components are able to be neglected.

The second resistance R2 must not be excessively high so as to have a low voltage drop Vd when the loop is present, as there is a holding current Im of 40 nA through this resistor. As a result, Vd must remain at a few tens of mV. In the case where the tamper loop 21 is present, this voltage drop across the resistors R1, R2 must in principle be below a switching threshold value of the first inverter 22, for example below Vsup/2, so as to have an output signal at 1 at the output of the first inverter 22.

In order to leave the option of adding an assembly capacitor in the same range as the first capacitor C1, the intrinsic time constant of the pre-charging or of the discharging of the first capacitor C1 must be around 1 to 2 µs, the pre-charging or discharging times being able to have a duration of 100 µs at most.

As a result, taking into account all of these considerations, a good compromise is found by using the following values:

R2=200 kOhms and C2=0.5 pF, giving the following result:

$$F2 = 1/(2 \cdot \pi \cdot R2 \cdot C2) = 1.59 \text{ MHz (approximately three octaves below)}$$

R2>>R1 (200 kOhms>>120 Ohms) and C1>>C2 (5.4 pF>>0.5 pF)

As for the voltage drop Vd=2·R1·Im=16 mV and the pre-charging or discharging time constant:

$$T = R2 \cdot 2 \cdot C1 = 2.2 \text{ µs}$$

The circuitry of the management unit 20 with the low-pass filters 25, 26, 27, 28 makes it possible to remove the inductive effects of nearby electromagnetic fields, such that the tamper loop is able to be considered as a detectable short circuit, when it is present.

The first capacitor C1 of the first and second low-pass filters also has the property of assisting in the detection of the breakage or the absence of the tamper loop when only the assembly parasitic capacitor Cp remains, because a sharing of charges takes place, thereby avoiding having an erroneous diagnosis.

To explain the behaviour of the active part of the management unit 20, consideration must be given to the first case, in which the tamper loop 21 is present before the start of the evaluation of its state, and to the second case, in which the tamper loop 21 is interrupted or broken or never connected.

In the first abovementioned case, a current mirror is in an OFF state, despite the fact that the current in is still available. As the nodes Tamper_in and Tamper_out are pre-charged, the output signal Short is set to 0, since an NMOS transistor in the first inverter 22 is not controlled in terms of current.

As explained above, during the evaluation period, the control signal Tamper_en is set to 1, this leading, on the positive power supply Vsup side, to the second transistor M2 being switched OFF and it being replaced with the pair of the third and fourth transistors M3, M4. This gives rise to a very small current, for example of the order of 40 nA, for holding the voltage level in the case where the tamper loop is absent. The fifth transistor M5 is also capable of giving rise to 40 nA while the current mirror is active. On the ground side, the first transistor M1 is switched ON, this resulting in the discharging of all of the capacitors on both sides of the tamper loop. As a result, the input of the first inverter 22 is at a level 0 below a switching threshold value of the first inverter 22. This indicates the presence of a short circuit between Tamper_in and Tamper_out.

It should be noted that a very small continuous current, limited to 80 nA, is necessary to ensure that this function operates correctly. There is a current of 40 nA through the eighth transistor M8 for controlling the voltage of the current mirror and 40 nA through the pair of the third and fourth transistors M3, M4 in an attempt to hold the voltage level. However, this is not possible since the first transistor M1 and the associated resistors are larger, and the rest of the consumption is only transient during the switching operations and not continuous.

In the abovementioned second case, the logic input signal Tamper_en is set to 0, this meaning that the first transistor M1 is OFF and the second transistor M2 is ON. However, this time, the capacitors are pre-charged differently. The capacitors C1 and C2 on the Tamper_in side are completely pre-charged, while the parasitic capacitor Cp and the capacitors C1 and C2 on the Tamper_out side are partially charged, as the equivalent capacitor is Cp in series with a parallel assembly of C1 and C2, given that the tamper loop 21 is absent.

Next, during the evaluation period, the logic input signal Tamper_en is set to 1, this resulting in the partial discharging of the capacitors C1 and C2 that are on the Tamper_out side. This discharging has a slight effect on the Tamper_in side, as the parasitic capacitor Cp is only partially charged, leading to a charge sharing of the charges stored in C1 and C2 on the Tamper_in side. However, this effect does not have any detrimental consequences, given that the amount of shared charges is not large enough, with consideration to the permitted value of Cp, to reduce the input voltage of the first inverter 22 below its switching point. Moreover, the pair of the third and fourth transistors M3, M4 is active so as to restore the voltage level. As a result, the level on Tamper_in is held at 1 as the input of the first inverter 22. The output signal Short thus remains in the off state at 0, this signifying the absence of a short circuit with the open tamper loop.

It should be noted that, during the evaluation period, the continuous current consumption is limited to 40 nA, this corresponding to the reference current attacking the current mirror, as once the pair of the third and fourth transistors M3, M4 has restored the voltage level, there is no more current through said current mirror. As the tamper loop is absent, no continuous current flows through the first transistor M1.

Another use of this unit 20 for managing the tamper loop 21 is that of continuously managing the state of the tamper loop or of a switch. During the evaluation period, which may last as long as desired, the current consumption is limited to 80 nA when the loop is present or the switch is closed, while the signal Short is set to 1. By contrast, when the loop 21 is open or the switch is open, the pair of the third and fourth transistors M3, M4 charges the node Tamper_in, driving the output signal Short to 0.

The evaluation or the determination of the state of the tamper loop 21 may be carried out automatically at programmed periods of time and upon request from the logic unit. In principle, it may also be envisaged that, following detection of breakage of the tamper loop, this information is automatically stored in one of the non-volatile memories, so as to transmit this information upon request through an HF or UHF communication.

From the description that has just been given, numerous variants of the dual communication frequency RFID circuit equipped with a tamper loop may be conceived by those skilled in the art, without departing from the scope of the invention defined by the claims. A plurality of low-pass filters may be connected one after the other starting from each connection terminal of the tamper loop. The current source formed using the third and fourth MOS transistors may be linked to ground, while the first transistor, as switch, may be linked to the supply voltage.

What is claimed is:

1. A dual communication frequency RFID circuit, comprising a logic unit for processing data signals received or transmitted at a first frequency by a first antenna or at a second frequency by a second antenna, the first communication frequency being lower than the second communication frequency, the logic unit being connected to a management unit for managing a state of a tamper loop linked to an integrated circuit by two connection terminals,
wherein the management unit comprises at least one first low-pass filter linked to a first connection terminal, at least one second low-pass filter linked to a second connection terminal, a current source for supplying a current through the first low-pass filter, a switch linked at the output of the second low-pass filter, and a first inverter connected between the current source and the first low-pass filter for supplying an output signal for the state of the tamper loop to the logic unit.

2. The RFID circuit according to claim 1, wherein the first low-pass filter and the second low-pass filter each comprise a first resistor and a first capacitor.

3. The RFID circuit according to claim 2, wherein the first low-pass filter is identical to the second low-pass filter with one and the same first resistor and one and the same first capacitor.

4. The RFID circuit according to claim 2, wherein the first resistor of the first low-pass filter is linked to the first connection terminal, wherein the first capacitor of the first low-pass filter is linked to a ground terminal or to a supply voltage terminal, wherein the first resistor of the second low-pass filter is linked to the second connection terminal, and wherein the first capacitor of the second low-pass filter is linked to a ground terminal or to a supply voltage terminal.

5. The RFID circuit according to claim 2, wherein a third low-pass filter is connected to the first low-pass filter between the first low-pass filter and the current source linked to an input of the first inverter, and wherein a fourth low-pass filter is connected to the second low-pass filter between the second low-pass filter and the switch.

6. The RFID circuit according to claim 5, wherein the third low-pass filter and the fourth low-pass filter each comprise a second resistor and a second capacitor, wherein the second resistor of the third low-pass filter is linked to a connecting node for the first resistor and the first capacitor of the first low-pass filter, wherein the second resistor of the fourth low-pass filter is linked to a connecting node for the first resistor and the first capacitor of the second low-pass filter, wherein a connecting node for the second resistor and the second capacitor of the third low-pass filter is linked to the current source and to an input of the first inverter, and wherein a connecting node for the second resistor and the second capacitor of the fourth low-pass filter is linked to the switch.

7. The RFID circuit according to claim 6, wherein the third low-pass filter is identical to the fourth low-pass filter with one and the same second resistor and one and the same second capacitor.

8. The RFID circuit according to claim 6, wherein a second PMOS transistor is linked between a supply voltage terminal and the connecting node for the second resistor and the second capacitor of the third low-pass filter, a gate of the second PMOS transistor being controlled by an activation signal.

9. The RFID circuit according to claim 8, wherein the logic unit supplies a logic input signal to the management unit, which management unit comprises a second inverter followed by a third inverter, the second inverter receiving the logic input signal so as to supply an inverse activation signal and the third inverter supplying the activation signal.

10. The RFID circuit according to claim 9, wherein the management unit comprises, between the supply voltage terminal and a reference current terminal, a sixth PMOS transistor linked in series with a seventh PMOS transistor, and an eighth PMOS transistor, connected in parallel with the sixth and seventh PMOS transistors, wherein a gate of the eighth PMOS transistor is linked to a connecting node for the sixth and seventh PMOS transistors so as to supply the control signal, wherein a gate of the sixth PMOS transistor is controlled by the activation signal, and wherein a gate of the seventh PMOS transistor is controlled by the inverse activation signal.

11. The RFID circuit according to claim 10, wherein the power supply of the first inverter is supplied by way of a fifth PMOS transistor connected to a supply voltage terminal, a gate of this fifth PMOS transistor being controlled by the control signal.

12. The RFID circuit according to claim 6, wherein the resistance of the second resistor of the third and fourth low-pass filters is greater than the resistance of the first resistor of the first and second low-pass filters, and wherein the capacitance of the first capacitor of the first and second low-pass filters is greater than the capacitance of the second capacitor of the third and fourth low-pass filters.

13. The RFID circuit according to claim 1, wherein the switch is a MOS transistor linked at the output of the second low-pass filter and connected to a ground terminal.

14. The RFID circuit according to claim 13, wherein the MOS transistor is an NMOS transistor, a gate of which is controlled by an activation signal so as to put the NMOS transistor into the on state to allow the flow of a current originating from the current source, which current source is linked to a supply voltage terminal, when the tamper loop is not broken or absent.

15. The RFID circuit according to claim 14, wherein the current source comprises a third PMOS transistor in series with a fourth PMOS transistor, the third and fourth PMOS transistors being arranged between the supply voltage terminal and an input of the first inverter, wherein a gate of the third PMOS transistor is controlled by a control signal so as to put it into the on state, and wherein a gate of the fourth PMOS transistor is controlled by an inverse activation signal so as to put it into the on state.

* * * * *